US007406480B2

(12) United States Patent
Seibel et al.

(10) Patent No.: US 7,406,480 B2

(45) Date of Patent: Jul. 29, 2008

(54) AUTOMATED VOTER REGISTRATION AND TABULATION SYSTEM

(76) Inventors: John Seibel, 5611 Northfield Rd., Bethesda, MD (US) 20814; Nicholas Koumoutseas, 709 N. Stonestreet Ave., Rockville, MD (US) 20852

(*) Notice: Subject to any disclaimer, the term of this patent is extended or adjusted under 35 U.S.C. 154(b) by 187 days.

(21) Appl. No.: 10/023,990

(22) Filed: Dec. 21, 2001

(65) Prior Publication Data

US 2002/0091673 A1 Jul. 11, 2002

Related U.S. Application Data

(60) Provisional application No. 60/258,499, filed on Dec. 29, 2000, provisional application No. 60/257,150, filed on Dec. 22, 2000, provisional application No. 60/333,733, filed on Nov. 29, 2001.

(51) Int. Cl.

| | |
|---|---|
| ***G06F 17/30*** | (2006.01) |
| ***G06F 7/00*** | (2006.01) |
| ***G06F 11/00*** | (2006.01) |
| ***G07C 13/00*** | (2006.01) |

(52) U.S. Cl. .......................... 707/104.1; 707/10; 707/3; 705/12; 235/51

(58) Field of Classification Search ..................... 707/1, 707/3, 10, 104.1; 235/51, 386, 38; 705/12

See application file for complete search history.

(56) References Cited

U.S. PATENT DOCUMENTS 4,776,510 A * 10/1988 Jenkins ....................... 229/303
5,218,528 A * 6/1993 Wise et al. .................... 705/12
5,878,399 A * 3/1999 Peralto ........................ 705/12
6,081,793 A * 6/2000 Challener et al. ............ 705/50
6,250,548 B1 * 6/2001 McClure et al. ............... 235/51
6,311,190 B1 10/2001 Bayer et al.
2004/0046021 A1 * 3/2004 Chung ........................ 235/386

* cited by examiner

*Primary Examiner*—Kuen S Lu

(74) *Attorney, Agent, or Firm*—Roylance, Abrams, Berdo & Goodman, L.L.P.

(57) ABSTRACT

A system and method of registering voters and tabulating an election is provided. A voter database is maintained with a record of each eligible voter comprising at least one voter characteristic. Based on the at least one voter characteristic, a set of positions and issues for which the voter is eligible to vote is determined. The set of positions and issues is printed onto a ballot. The ballot may be printed on demand or mailed to the voter along with a return envelope and an anonymous ballot envelope. A system and method for tabulating and auditing election results is also provided. Voted ballots are scanned and computer readable visual representations of the ballots are generated and stored. The visual representations are analyzed to generate vote data. The visual representation, vote data and ballot are associated with each other by a unique ballot identification. Visual representations of ballots can be retrieved based on a database query and displayed along with the associated vote data for review. Based on the unique ballot identification, the ballot associated with the vote data may also be identified and reviewed. If necessary, vote data associated with a ballot may be corrected.

25 Claims, 5 Drawing Sheets

AUTOMATED VOTER REGISTRATION AND TABULATION SYSTEM

The present invention claims priority from U.S. Provisional Application Ser. No. 60/257,150 filed Dec. 22, 2000, U.S. Provisional Application Ser. No. 60/258,499 filed Dec. 29, 2000, and U.S. Provisional Application Ser. No. 60/333,733 filed Nov. 29, 2001, each of which is expressly incorporated herein by reference.

FIELD OF THE INVENTION

The present invention is related to voting systems. More particularly, the present invention is directed to a system and method for generating individual ballots based on a database of issues and candidates for which particular registered voters are authorized to vote, as well as a system and method for tabulating and auditing voted ballots.

BACKGROUND OF THE INVENTION

As the most recent presidential election demonstrated, present election systems are not 100% accurate. There are several problems with present election systems which contribute to the inherent inaccuracy. While the vast majority of ballots in most election systems are cast and recorded without incident, a small percentage of ballots are often counted incorrectly, either because of human error, or because the intent of the voter is not cleat from the ballot. In close elections, the outcome may depend on the accurate accounting of every ballot. Furthermore, it should be the goal of every election to include the greatest participation of registered voters, and to accurately count as many cast ballots as possible in the final tabulation of results.

One problem with present election systems occurs when a voter votes too many or too few times on a particular ballot. As an example, the voter may be required to choose one candidate for the office a president, but choose several candidates for a local office. Voters occasionally vote for too many or too few candidates for a particular office, or forget to vote on a particular office or issue.

Another problem with most present election systems is each voter must show up to their designated voting location. It would be desirable to allow voters to choose among several voting locations. In this manner, mote voters may be able to vote at a more convenient location, who otherwise may not have participated. Thus, total voter participation would be increased.

Another problem with present election systems is maintaining the integrity of the election by accounting for all of the ballots produced. Most election systems produce more ballots than necessary, and all ballots are identical. Ideally, one ballot would be produced for each voter, and furthermore the ballot would be unique to that voter, while maintaining anonymity with regard to the actual votes case by a particular voter.

Finally, in close elections, it is often important to audit the election to ensure an accurate tabulation. However, in many present election systems, entire batches of ballots must be reviewed, because there is no simple way to separate the erroneous ballots. The inventors are unaware of any current election system that provides a means to retrieve a set of ballots according to the vote data associated therewith. The result is a tremendous amount of tedious work to review entire batches of voted ballots in close elections.

SUMMARY OF THE INVENTION

The above disadvantages are overcome and other advantages are realized in a system and method according to an embodiment of the present invention. The present invention provides a method of conducting an election comprising the steps of storing a database of voter records, such that each voter record comprises at least one voter characteristic. Based on the at least one characteristic, a set of positions and issues for which a voter is eligible to vote is determined, and a ballot is generated comprising the determined set of positions and issues.

The invention further provides a system for conducting an election comprising a database adapted to store records for a plurality of voters. Each record comprises at least one voter characteristic. The system further comprises a printer adapted to print a ballot for at least one voter. The printer determines, based on the at least one voter characteristic, a set of positions and issues for which the voter is eligible to vote, and prints a ballot comprising the set of positions and issues.

The invention provides a method of auditing an election. The method comprises the steps of marking each of a plurality of voted ballots with a unique ballot identification. The voted ballots are scanned and computer readable visual representations of the ballots are generated and analyzed. Vote data is determined for each ballot based on the visual representation generated. Further, the visual representation and the vote data for each ballot are associated with the ballot based on the unique ballot identification. Furthermore, a computer readable medium in accordance with the present invention has stored thereon computer readable and executable instructions, when executed by at least a computer, causes the computer to perform a method of auditing an election wherein exemplary steps of the method control a system to record and audit election results.

The invention also provides a system for auditing an election, comprising a scanner adapted to generate computer readable visual representations of voted ballots. The system further comprises a processor adapted to generate vote data based on the visual representations. The visual representations are then associated with the vote data. The system additionally comprises a display device adapted to display at least one of the visual representations along with the associated vote data.

BRIEF DESCRIPTION OF THE DRAWINGS

The various objects, advantages and novel features of the present invention will be more readily understood from the following detailed description when read in conjunction with the appended drawings, in which.

Throughout the drawings, like reference numerals will be understood to refer to like parts and components.

DETAILED DESCRIPTION OF THE PREFERRED EMBODIMENTS

Figure 1:
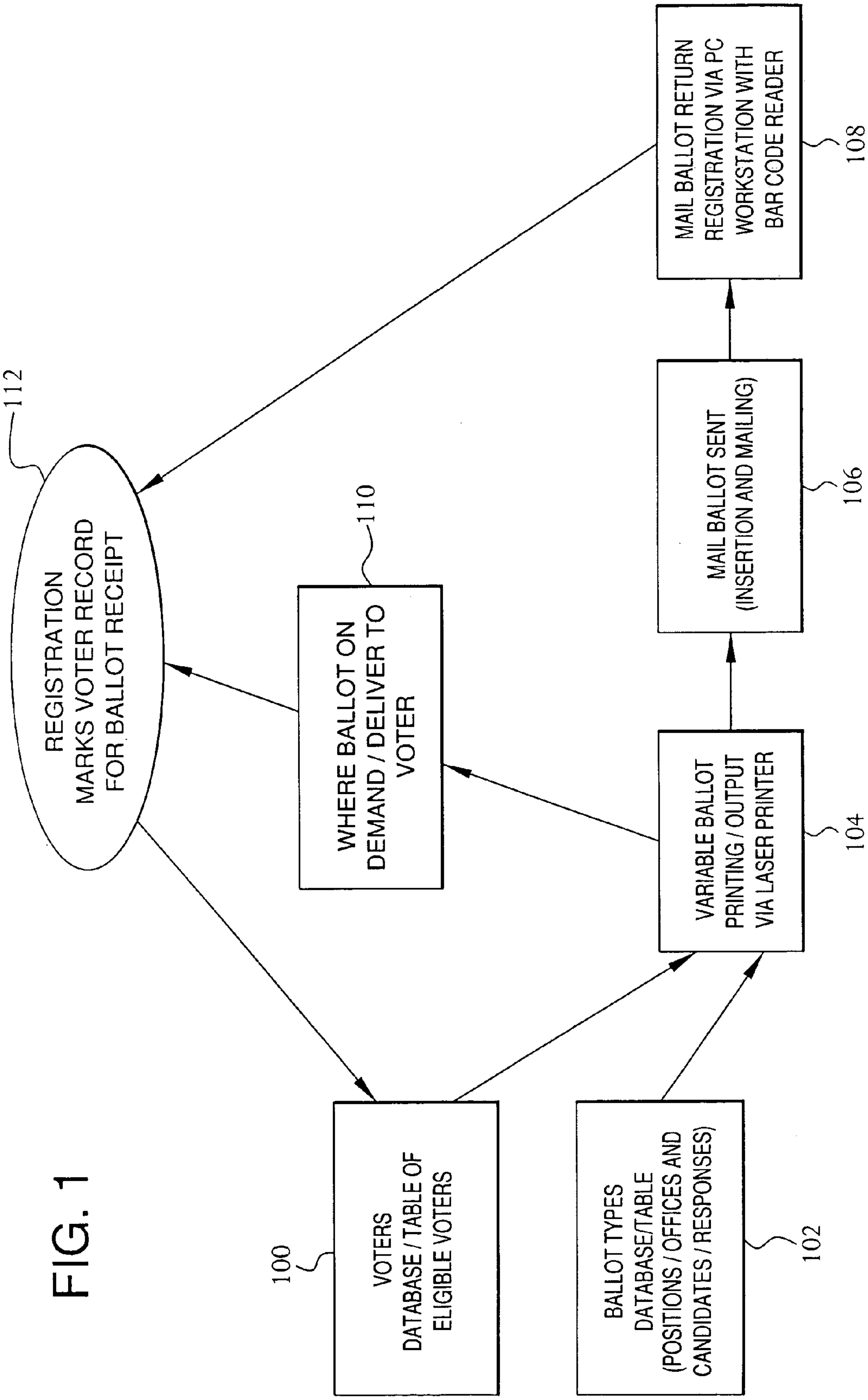
FIG. 1 is a diagram illustrating how ballots are generated and registered in accordance with a preferred embodiment of the present invention.

The present invention relates to a combined registration and tabulation system for use by any organization maintaining a database of eligible voters. In the embodiment shown in FIG. 1, the information in the database includes the names of eligible registered voters 100, as well as the types of ballots 102 for various possible combinations of candidates and issues for which individual voters are authorized to vote.

A system according to an embodiment of the present invention will print a basic ballot substrate or "form." The ballot may be printed, for instance, on 8½x11-inch stock with a perforated footer via offset printer. The form may also have a graphic or patterns and/or colors that are extremely difficult to duplicate to reduce the possibility of fraud. If ballots are to be mailed to voters, appropriate envelopes will also be generated by the system.

A system according to an embodiment of the present invention will print and tabulate multiple ballot types. A ballot may contain different items or positions depending on how voters are grouped, and which positions and issues individual voters are eligible to vote upon. In accordance with an embodiment of the invention, one voter may vote some common or separate issues as another voter.

A ballot-printing device 104 electronically assembles a paper ballot for each voter and records and tracks its assembly and printing. With the form described above as the background, and with the eligible voter database 100, the ballot-printing device 104 will generate a unique ballot for each voter. The ballots may be printed, for example, by high-speed laser printer. The ballot will preferably contain ballot receipt information on the footer (with general instructions and information). The data on the perforated footer will preferably include the name and address of the voter, the ballot return depository address, and an encrypted bar coded voter identification or identification number. The voter identification number will preferably consist of a bar code of the voter's account number, or other unique member number which can be encrypted, generated, and maintained by the organization conducting the election.

Finally, the ballot-printing device 104 prints the offices and the names of the candidates or issues on which that voter is entitled to cast a vote. This process ensures that the voter will always get the correct ballot type. In addition, by generating a single ballot for each voter, there is no need to generate "votable" spare ballots, thus eliminating a significant cost and a large security risk.

Because ballots can be printed on demand, it is possible to print the ballots in any order. Thus, ballots that are to be mailed to voters may be printed in postal pre-sort order to take advantage of postal rate reductions. Similarly, if ballots are to be printed at a voting station, they may be printed on demand for each individual voter, as they arrive at the voting station to vote. Advantageously, it is not necessary to print ballots in batches according to ballot type.

Figure 2:
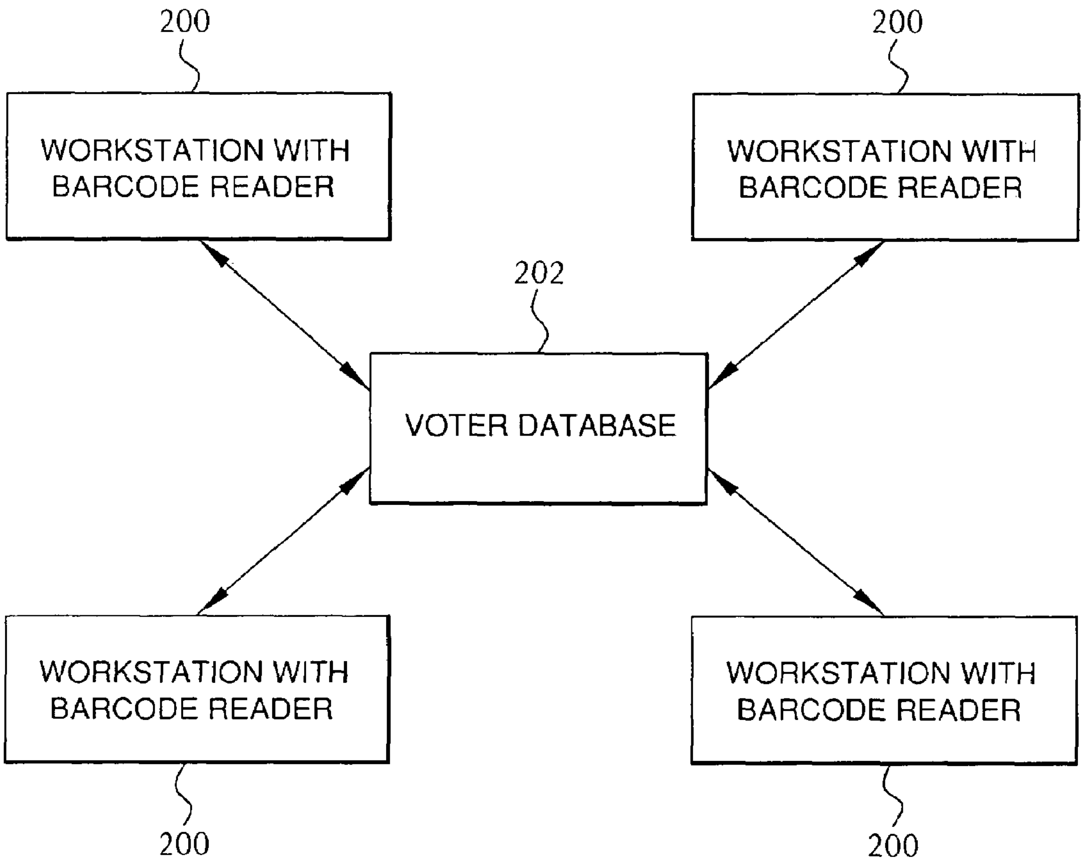
FIG. 2 is a block diagram of a voter registration system in accordance with an embodiment of the present invention, showing multiple voting locations connected to a central database.

In one embodiment, multiple voting stations 200 are connected to a central database 202 of eligible voters, as shown in FIG. 2. Thus, voters may show up to any one of a plurality of voting locations 200 to vote. The voting station 200 at their location can access the voter database 202 and print an appropriate ballot on demand.

In another embodiment, ballots may be sent to voters via the mail, as shown generally at 106 in FIG. 1. Such ballots may be sent using a double return envelope. The outgoing package includes the ballot, a return ballot envelope and a secret ballot envelope. The outgoing envelope is preferably a single windowed envelope, through which the voter's address and identifying bar code (laser printed on the footer) appears. The voting organization's address is preferably printed as the return address on the outgoing envelope for the return of undeliverable ballots. Thus, the voting organization is capable of electronically tracking all undelivered ballots returned to it. If the organization can obtain corrected addresses for undelivered ballots, duplicate ballot are preferably generated and re-mailed. Otherwise, undelivered ballots are retained in a secure place until the election is complete.

The voter preferably receives the ballot via first class mail. After removing the ballot from the envelope and marking the ballot, the voter detaches the perforated footer from the ballot and places the marked ballot in the secret ballot envelope. The footer and the secret ballot envelope are placed in the return ballot envelope, and mailed, as shown at 108. The return ballot envelope is preferably a double window envelope through which appears the detached ballot footer with the ballot depository address, and the voter identification number. Using this system, it is extremely difficult for the voter to return an unidentifiable ballot. It is impossible for a voter to vote more than once, and because the identification number is preferably encrypted, it is virtually impossible to counterfeit a ballot. In addition, because registration is accomplished digitally, a database of registered voters is created which can later be used by the voting organization for analysis, history, or trending.

Duplicate ballots can be generated and electronically tracked via the voter identification number. The voting organization could limit the generation of such duplicate ballots to specific and authorized requests only. Thus, the present invention provides a high degree of control over ballot production. One ballot is produced per voting member, and duplicates can be produced where needed. Furthermore, the present invention advantageously enables the voting organization to limit duplicate ballots to specific individual situations where the organization approves of the generation of a duplicate. The duplicates are limited to situations where the organization has control over the original, such as a ballot which was returned through the mail as undeliverable, or returned in person by the voter as a spoiled ballot. Thus, the opportunities for fraudulent voting are significantly diminished.

The voting organization will preferably obtain a local post office box and if required, a business reply mail account. Voted ballots may then be returned to the post office box depository near to a ballot count site, and retrieved the day of the ballot count. Ballots would preferably be retrieved on the day of the count, rather than sooner, to minimize security risks associated with retrieving and registering returned ballots prior to the count date.

The system can also be configured for Ballot on Demand, as shown generally at 110. A Ballot on Demand system is one where a ballot is not printed until the voter arrives to request it. Because the expected voter participation level may vary, a Ballot on Demand significantly reduces the amount of printing and consequent waste, and eliminates auditing of unused ballots.

With the form as the background or with plain paper, and with the membership database, a system in accordance with the current invention will generate a single ballot for each voter, preferably by laser printer, at the time that the voter arrives to claim his/her ballot. A voting location is set up and will contain computer workstations, preferably with bar code readers, in a discrete area. A bar coded meeting badge is preferably used by each voter as a ticket to receive a ballot. When a Voter arrives they are "registered" either by name or with the bar code located on the voter's meeting badge. The staff, after visually checking the meeting badge, scans the bar code on the meeting badge. The scanning of a valid (not previously used) bar code or voter number checks voter eligibility and causes that voter's ballot to be automatically generated. That voter's record in the database is then marked, indicating that the voter has voted. Once a bar code/badge is used, and a ballot generated, it cannot be used again. This registration system ensures that only eligible voters can be registered, that the voter receives the correct ballot and that each voter can only vote once. Also, because each ballot is associated with an individual voter record in a central database, it is possible for there to be multiple voting locations, and for voters to go to the location of their choice. The central voter database will reflect that a voter has voted regardless of the location in which they have chosen to vote. After printing, the ballot is handed to the voter. The ballots are voted by marking them and placing them in a designated, secure ballot box.

By generating a single ballot for each voter, there is no need to generate ballots in advance, keep track of preprinted ballots, or account for ballots during the balloting period, thus eliminating a large security risk.

If a ballot is spoiled, a duplicate ballot can be generated. It is possible, through this system, to limit the generation of duplicate ballots to situations where they are specifically requested, and where the original ballot is returned. Similarly, if an individual arrives without a meeting identification badge, it would be possible to print a ballot for him/her, after request, confirmation, and authorization.

Registration of returned voted ballots, whether they are returned by mail or at a voting location, is shown generally at 112. For ballots returned by mail, the vote registration system is a preferably a local area computer network with a flexible number of workstations, in order to efficiently register each returned ballot. Each registration station is preferably a computer with a bar code reader and headphones. A registration station operator scans the bar code showing through the window of the return ballot envelope. Registration of the ballot checks the voter database to determine whether the voter has previously been registered, whether a duplicate ballot has been issued, and is otherwise eligible. Eligibility can be updated anytime before the registration commences to accommodate voters who have become ineligible during the balloting period. In the event that a voter has previously been registered (by duplicate or otherwise), or the ballot is otherwise ineligible, the operator may be alerted by visual and audio cue, and the ballot is preferably removed and put aside.

After the mail in ballots are registered, they may be opened. As they are opened, the return stubs that include voter associated information ate separated from the anonymous ballot envelopes, ensuring anonymity. The anonymous ballot envelopes are then opened, and the ballots are removed and tabulated.

Figure 3:
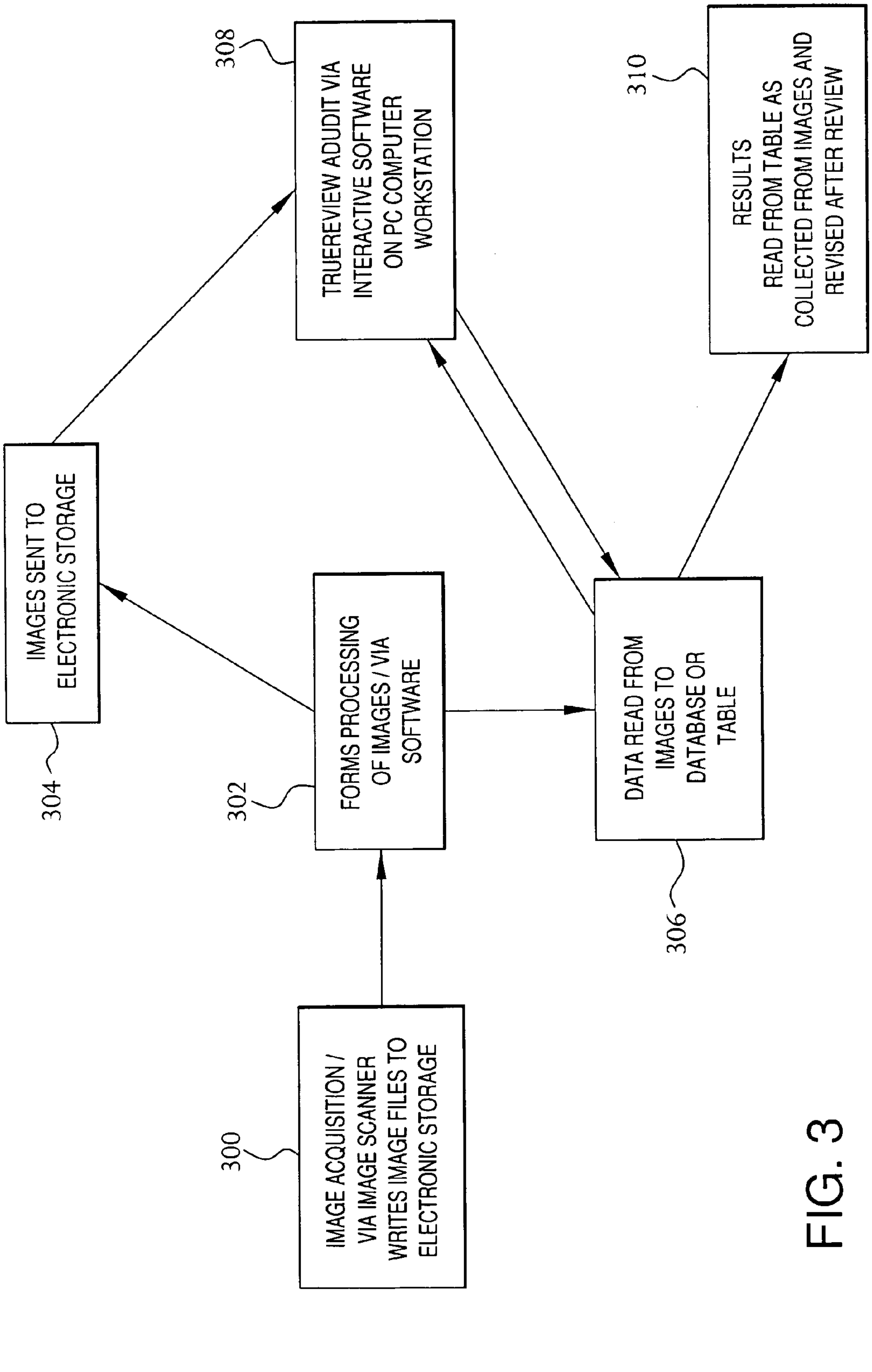
FIG. 3 is a diagram showing a tabulation and auditing process in accordance with a preferred embodiment of the present invention.

According to an embodiment of the present invention, tabulation is accomplished via optical/digital scanning of each ballot, preferably using a high-speed optical scanner. The ballots are fed through an optical scanner and images of each ballot are acquired and stored as a visual representation of the ballot, preferably as computer readable electronic records, as shown at 300 in FIG. 3.

Images of the ballots are captured and processed, as shown at 302. When an image is captured it may be given a unique identification name or number that preferably corresponds to the scanner, batch and number of the individual paper ballot. The paper ballot corresponding to the image is also preferably marked with the unique identification. Thus, the image can later be compared to its corresponding paper ballot to ensure that they are identical. The captured images are recorded to an electronic storage device 304. After acquiring the images a separate processor analyzes each image to extract the vote data. The vote data extracted from each ballot is stored as a record in a database 306. After processing the images to obtain vote data, a computer can analyze the record of each ballot, and apply rules to look for over-voted or otherwise problematic ballots. With the present system, over-voted ballot images can be reviewed on a display device such as a computer monitor to confirm that they do violate the rules.

Figure 4:
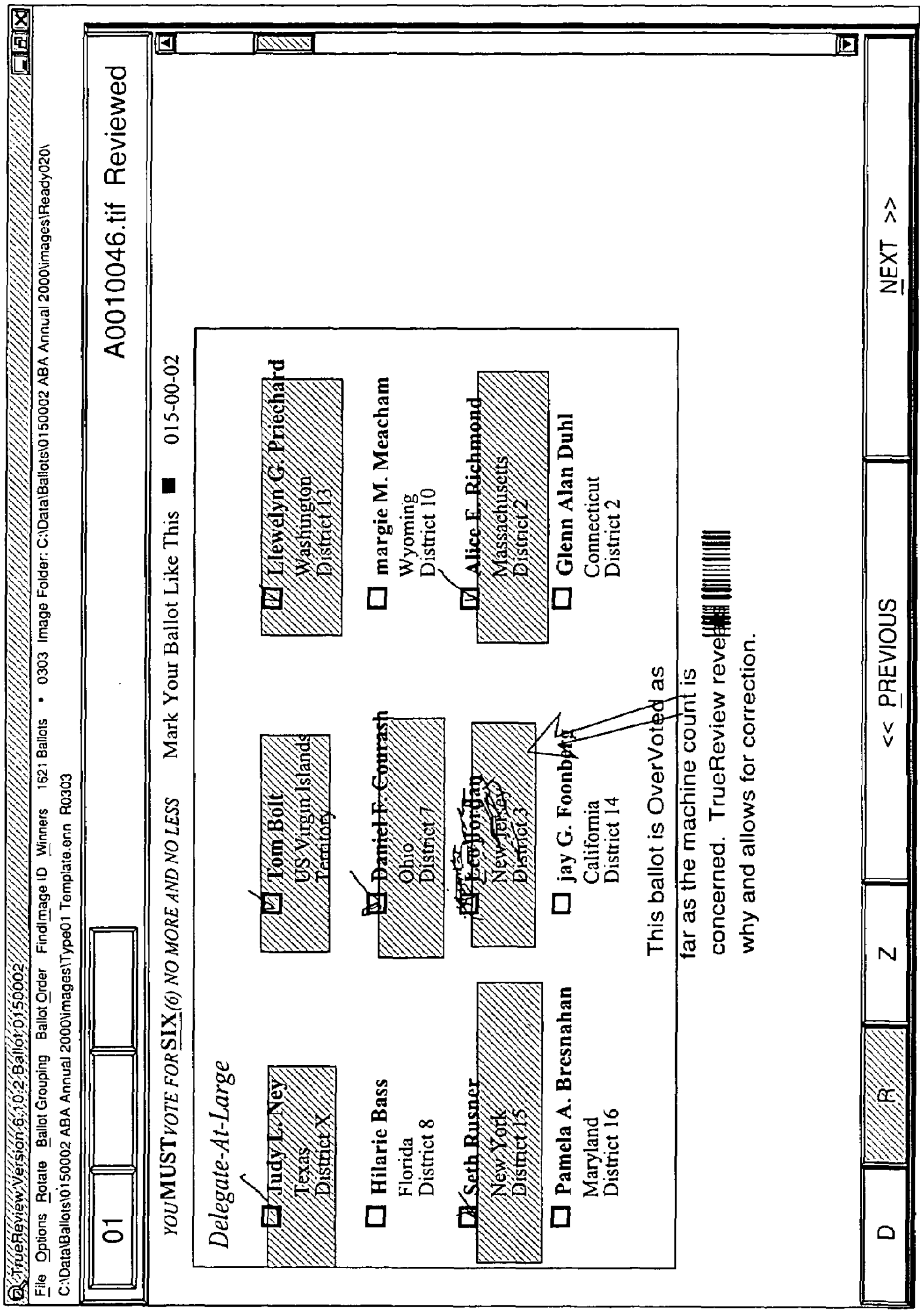
FIG. 4 is an exemplary image of an over-voted ballot for review in an auditing system according to an embodiment of the present invention.
Figure 5:
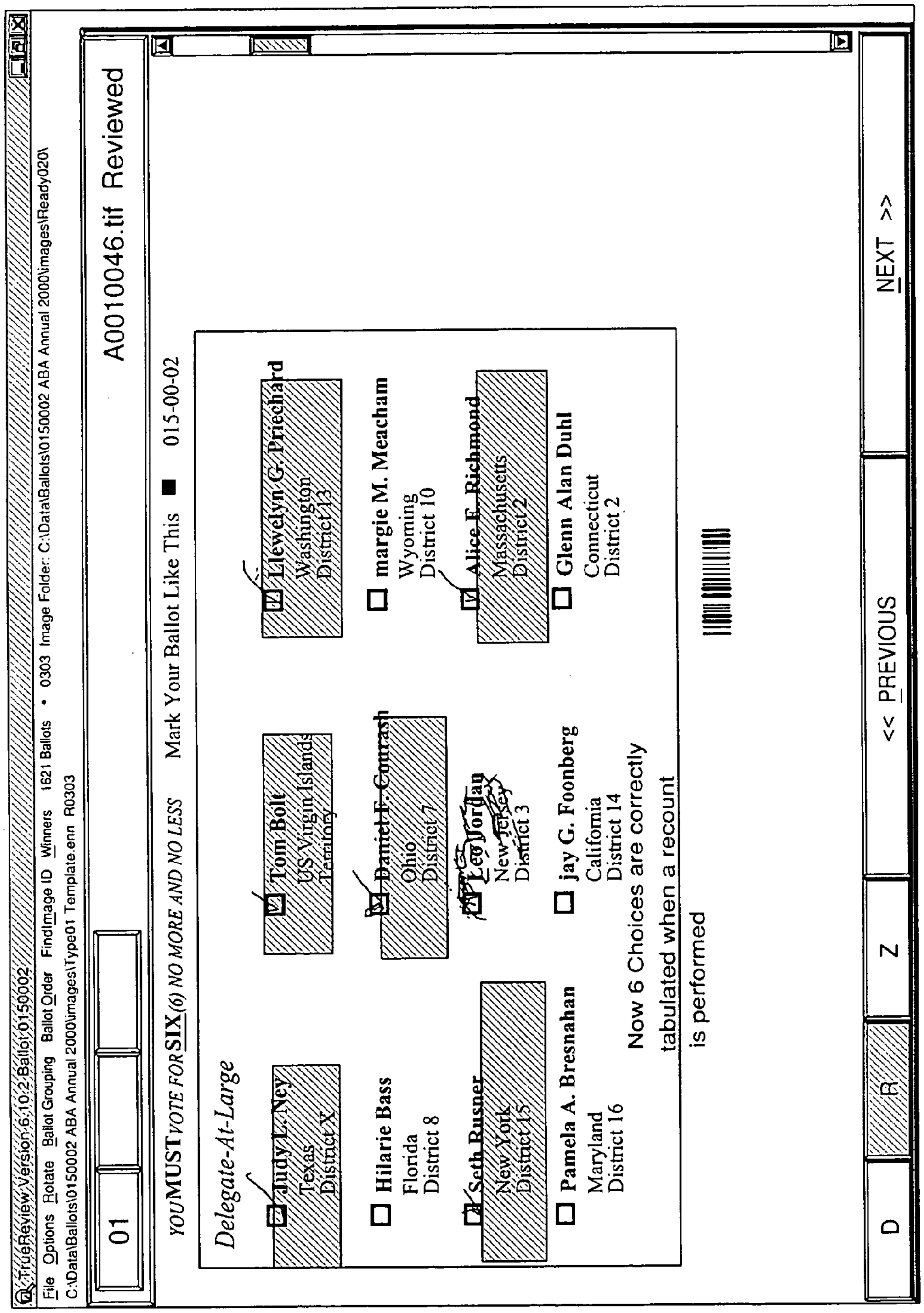
FIG. 5 is an exemplary image of an over-voted ballot that has been corrected using an auditing system according to an embodiment of the present invention.

As an example, FIG. 4 illustrates a screen shot of an over-voted ballot. The voter was instructed to choose six (6) of the available twelve (12) candidates. In this case it is apparent that the voter crossed one candidate out, but the computer registered seven votes, which is an over-vote. Upon review, it is clear which six candidates the voter intended to vote for, and the operator is able to remove the vote for the crossed-out candidate. An example of the corrected ballot is shown in FIG. 5. All images are preferably saved, stored and delivered to the organization.

Thus, according to the present invention, the image of any ballot can be retrieved from the storage device, displayed on a computer screen and reviewed. Furthermore, the original paper ballot can be compared to the ballot's image. Thus, if the voter's intent is evident, and differs from the vote data generated automatically by the system, the vote data can be modified by an authorized operator.

Because the present system couples images of each ballot to the data extracted from the ballot as well as the original paper ballot, a powerful and flexible auditing system is possible. The auditing process will allow filtering of those ballots that are to be viewed by a pre-made or custom database query. An auditing device is shown at 308. In order to audit the optical scanning process, the image of a particular ballot is viewed and compared to the record that contains the data extracted from the ballot. The data may be displayed, preferably, as annotations on top of the ballot image. The annotations can be interactive, allowing for corrections to the data where human judgment requires correction. With the present system anyone (not just the voting organization) can audit the election data as broadly or narrowly as desired or required. This eliminates the need to re-count stacks or bundles of ballots, and assures the accuracy of the data read from each form.

The coupling of a paper ballot to an electronic image of the ballot, and to the vote data extracted from that image allows for an audit of each ballot, or any group of ballots. Queries of the database can be as broad or narrow as required. Only the images and data that ate retrieved by the query are then viewed/audited. Assuming that each ballot was imaged, it can be audited to ensure that it was properly recorded.

Upon completion of any phase, a computer writes the original data to a permanent storage device, as shown at 310, preferably a CD-ROM. This provides a permanent, archived record of the original data, which can be reproduced but cannot be altered. This ensures the integrity and viability of the data. Depending on the requirements or needs of the organization, interim registration and/or tabulation totals can be publicly viewed in real time (including publication to the Internet), or can be as restricted as required At the conclusion of the process, the voting organization can certify the results and generate a written report. The CD-ROM with the tabulation data (including ballot images) and results is maintained by the voting organization together with the original voter list and voter registration data. The organization then has a complete history of the ballot. Demographic reports may also be stored on the CD-ROM as needed.

It should be understood that the present invention can advantageously be applied to existing election systems. Any election system having ballots which are susceptible of generating a visual image and analyzing the image to determine the votes case is capable of being audited in the above described manner. Thus, government entities using paper ballots may use the present invention to increase accuracy and turnout, while maintaining their present election system. This has the advantage of not requiring the voters to learn a new voting system.

While the invention herein disclosed has been described by means of specific embodiments and applications thereof, it should be appreciated that numerous modifications and variations could be made thereto by those skilled in the art without departing from the scope of the invention, which is set forth in the appended claims.

What is claimed is:

1. A method of auditing an election, said method comprising the steps of:

marking each of a plurality of voted paper ballots with a unique ballot identification, scanning said plurality of voted ballots and generating computer readable visual representations of each of said ballots, analyzing markings in said visual representations indicating a voter's intent made on said plurality of voted ballots and generating vote data associated with each of said plurality of voted ballots based on said visual representations of said ballots, associating each said visual representation and corresponding vote data with said voted ballot based on said unique ballot identification, retrieving at least one of said computer readable visual representations, displaying said computer readable visual representation and said vote data associated therewith on a display device, and modifying said vote data associated with.

2. The method of claim 1, wherein said vote data comprises said unique ballot identification.

3. The method of claim 1, further comprising the step of storing said computer readable visual representation and said vote data in a database.

4. The method of claim 1, further comprising the step of storing said computer readable visual representation and said vote data in a relational database.

5. The method of claim 1, further comprising the steps of:

retrieving at least one of said computer readable visual representations, displaying said computer readable visual representation and said vote data associated therewith on a display device, retrieving the voted ballot associated with said computer readable visual representation based on said unique ballot identification, and modifying said vote data associated with said voted ballot and said computer readable visual representation.

6. An election auditing system comprising:

a paper ballot allowing a voter to vote by marking the paper ballot, a scanner adapted to generate a computer readable visual representation of the voted paper ballot, a processor adapted to analyze markings in said visual representations indicating a voter's intent made on said voted ballot and generate vote data based on said visual representation of said ballot, said visual representation being associated with said vote data and said voted ballot, said computer readable visual representations being retrieved, a display device adapted to display said computer readable visual representation and said vote data associated therewith, and wherein said processor is adapted to modify said vote data associated with said voted ballot and said computer readable visual representation.

7. A system as in claim 6, further comprising a display device adapted to display at least one said visual representation and said vote data associated therewith.

8. A system as in claim 6, further comprising a ballot marking device adapted to mark said voted ballot with a unique ballot identification.

9. A system as in claim 8, wherein said processor is adapted to associate said unique ballot identification with said vote data and said visual representation of said voted ballot.

10. A system as in claim 6, further comprising a storage device for storing said vote data and said visual representation of said ballot.

11. A system as in claim 10, wherein said storage device comprises a database.

12. A system as in claim 10, wherein said storage device comprises a relational database.

13. A system as in claim 10, further comprising a display device, wherein said processor is adapted to retrieve said visual representation and said associated vote data, and to display said visual representation and said vote data on said display device.

14. A system as in claim 10, wherein said processor is adapted to retrieve at least one of a plurality of records from said storage device, each record comprising vote data and a visual representation of a voted ballot.

15. A system as in claim 13, wherein said processor is adapted to modify said vote data.

16. A system as in claim 8, wherein said processor is adapted to modify said vote data based on a review of the voted ballot associated with said unique ballot identification in said vote data.

17. A computer readable medium having computer executable instructions stored thereon, when executed by a computer, performing steps for controlling a system to record and audit election results comprising:

generating a computer readable visual representation of a voted paper ballot, and analyzing markings in said visual representation made on said voted paper ballot and generating vote data based on said visual representation of said voted ballot, and associating said vote data with said visual representation, retrieving at least one of said computer readable visual representations, displaying said computer readable visual representation and said vote data associated therewith on a display device, and modifying said vote data associated with said voted ballot and said computer readable visual representation.

18. The computer executable instructions as in claim 17, further executed to control said system to display at least one said Visual representation and said vote data associated therewith.

19. The computer executable instructions as in claim 17, further executed to control said system to mark said voted ballot with a unique ballot identification.

20. The computer executable instructions as in claim 19, further executed to control said system to associate said unique ballot identification with said vote data and said visual representation.

21. The computer executable instructions as in claim 17, further executed to control said system to store said vote data and said visual representation in a storage device.

22. The computer executable instructions as in claim 21, wherein said storage device Comprises a database.

23. The computer executable instructions as in claim 21, wherein said storage device comprises a relational database.

24. The computer executable instructions as in claim 21, further executed to control said system to retrieve at least one record from said storage device, said record comprising a visual representation of a voted ballot and vote data associated with said visual representation and said voted ballot.

25. The computer executable instructions as in claim 24, further executed to control said system to receive an input, and modify, said vote data based on said input.

* * * * *